United States Patent [19]

Reichhardt et al.

[11] 4,025,424
[45] May 24, 1977

[54] PROCESS AND APPARATUS FOR LIQUID-LIQUID COUNTERFLOW EXTRACTION

[75] Inventors: Horst Ludwig Reichhardt, Frankfurt am Main; Eckart Müller, Bergen-Enkheim; Helmut Markwort, Weisskirchen, all of Germany

[73] Assignee: Metallgesellschaft Aktiengesellschaft, Frankfurt am Main, Germany

[22] Filed: Oct. 5, 1974

[21] Appl. No.: 521,123

[30] Foreign Application Priority Data

Nov. 16, 1973 Germany .......................... 2357201

[52] U.S. Cl. ............................... 210/23 R; 210/84; 210/301; 210/323 R; 210/340; 210/358
[51] Int. Cl.² ........................................ B01D 21/10
[58] Field of Search ............ 210/DIG. 5, 323, 340, 210/341, 358, 23, 301, 84

[56] References Cited

UNITED STATES PATENTS

| | | | |
|---|---|---|---|
| 2,086,739 | 7/1937 | Reed | 210/323 X |
| 2,224,624 | 12/1940 | Adams et al. | 210/DIG. 5 |
| 3,231,091 | 1/1966 | Kingsbury et al. | 210/DIG. 5 |
| 3,450,632 | 6/1969 | Olson et al. | 210/23 |
| 3,902,997 | 9/1975 | Hartmann et al. | 210/23 |

*Primary Examiner*—Frank A. Spear, Jr.
*Attorney, Agent, or Firm*—Burgess, Dinklage & Sprung

[57] ABSTRACT

A process for liquid-liquid counterflow extraction based on the mixer-separator principle is disclosed. A dispersion of two liquid phases is fed to a separator and the clear phases are withdrawn therefrom. The dispersions to be separated are fed to the separator in two partial steams equal in rate of flow and flow through the separator in mutually opposite directions along respective paths each having a length equal to one-half of the diameter of the separator. Apparatus for carrying out the process includes inlets for the dispersion to be separated positioned at two opposite points of the periphery of the separator and outlets for the separated clear phases lying on the intervening diametral chord. The outlets and inlets can be reversed.

3 Claims, 8 Drawing Figures

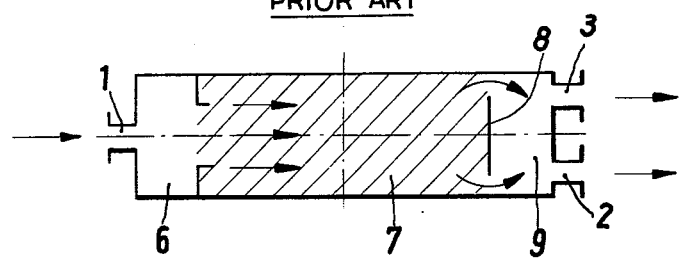
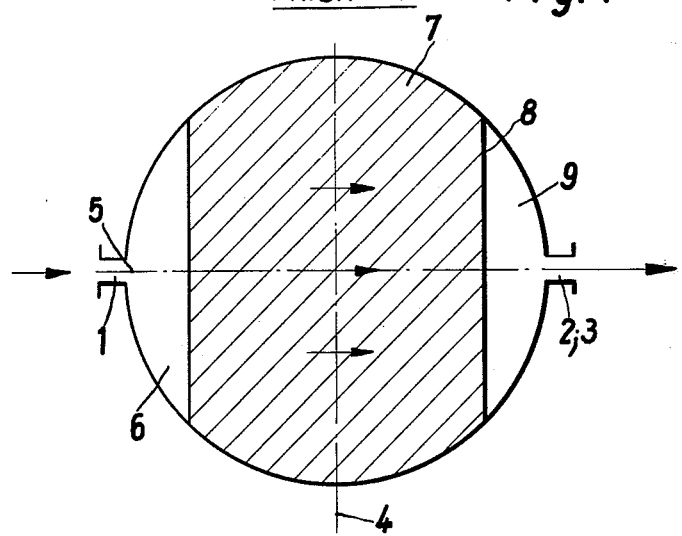

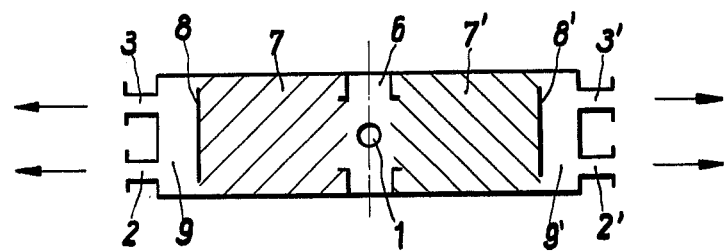
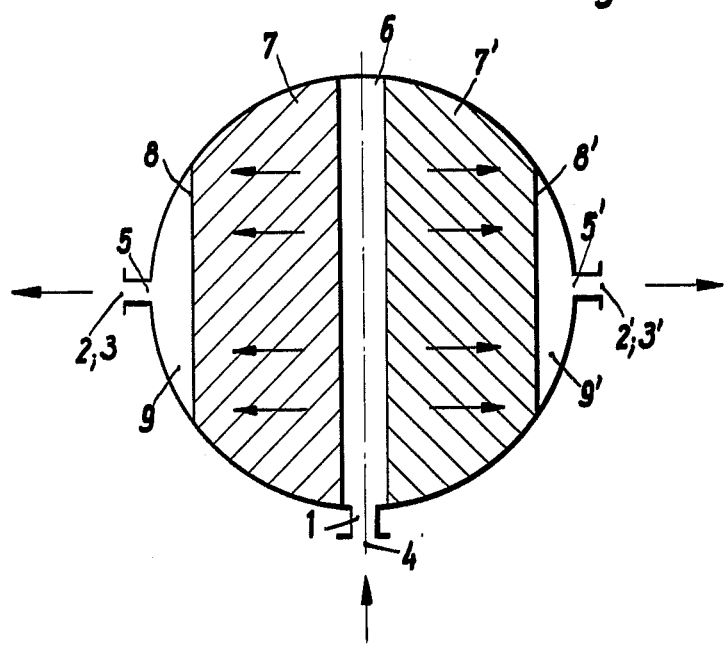

PROCESS AND APPARATUS FOR LIQUID-LIQUID COUNTERFLOW EXTRACTION

BACKGROUND

This invention relates to a process and apparatus for liquid-liquid counterflow extraction based on the mixer-separator principle, in which a dispersion of two liquid phases is fed to a separator and the clear phases are withdrawn from said separator.

It is known to use liquid-liquid counterflow extractors for a separation of two phases which are immiscible or difficultly miscible with each other. Such counterflow extractor consists usually of several stages, which are superimposed in a tower. For economical reasons, a small volumetric proportion of solvent, a short phase-separating time, and a large exchange surface area are desired (Verfahrenstechnik, 6th Year, No. 4, 1972, pages 123–128).

In these known extractors the dispersion to be separated is fed to a point at the periphery of the relatively low, circular separator and the separate phases are withdrawn on the opposite side. Where this procedure is adopted, the throughput rate per unit of bottom area, measured in $m^3/m^2$ h, decreases as the diameter of the apparatus increases.

SUMMARY

This invention avois these and other disadvantages of the state of the art and provides a process and apparatus which permit a high throughput rate per unit of bottom area, which can be attained even in apparatus which is large in diameter.

This is accomplished according to the invention by feeding the dispersion to be separated to the separator in two partial streams which are equal in rates of flow, the partial streams flow through the separator in mutually opposite directions, and each partial stream flows along a path which has a length equal to one-half of the diameter of the separator.

According to a preferred feature of the invention, the separator chambers are filled with sharp-edged turnings of high-grade stainless steel.

Apparatus of the invention for carrying out the process has separator chambers designed so that the inlets for the dispersion are disposed at two opposite points of the periphery and the outlets for the separate clear phases lie on the intervening diametral chord, or the inlet for the disperion is disposed along the diametral chord and the outlets for the clear phases are disposed at two opposite points periphery and laterally of said diametral chord.

The advantages afforded by the process and apparatus according to the invention reside particularly in that a high throughput rate per unit of bottom area can now be attained even with separators which are large in diameter. For instance, in accordance with the invention, the throughput rate of a dispersion to be separated in a separator which is 6 meters in diameter can be increased from the previous value of 660 $m^3$/h to 924 $m^3$/h, i.e., by 40%.

DESCRIPTION OF THE DRAWING

The invention will be explained more fully in the following example and with reference to the accompanying drawings, in which FIG. 3 is a vertical transverse sectional view showing a known separator chamber of the prior art, FIG. 4 is a horizontal transverse sectional view showing the arrangement of FIG. 3, FIG. 5 is a vertical transverse sectional view showing a separator chamber according to the invention with an inlet disposed on the diametral chord, FIG. 6 is a horizontal transverse sectional view showing the arrangement of FIG. 5.

DESCRIPTION

Figure 7:
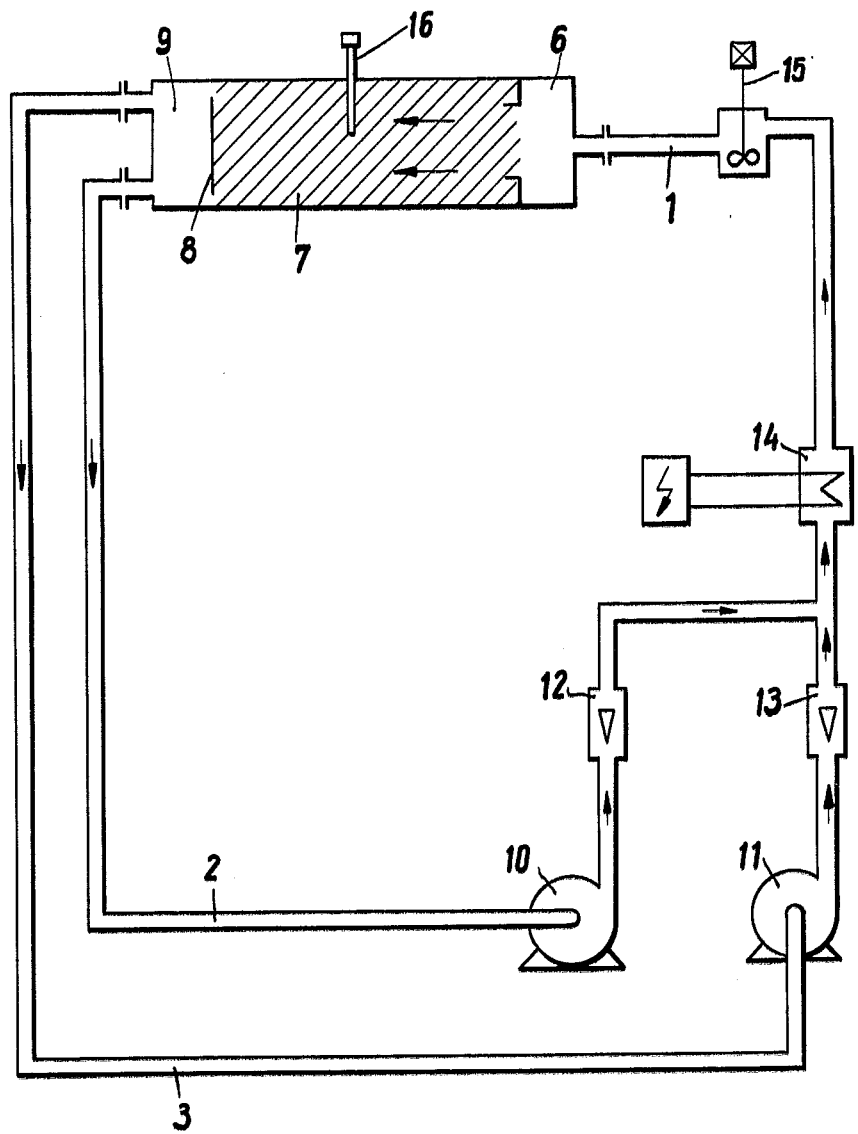
FIG. 7 shows apparatus for measuring the throughput rate of a separator.

In the drawing 1, 1' designate inlets for the dispersion, 2, 2' outlets for the heavy phase, and 3, 3' outlets for the light phase. 4 designates the diametral chord of the separator chamber. The line 4 can also be described as diameter line mid way between and at right angles to the inlets 1, 1' (or the outlets as the case may be). 5, 5' designate the periphery of the separator chamber, 6, 6' are distributor chambers, 7, 7' are separator chambers, 8, 8' are internal weirs, and 9, 9' are collecting chambers. In FIG. 7, 1o designates a pump for withdrawing the heavy phases, 11 a pump for withdrawing the light phase, 12 a flow meter for the heavy phase, 13 a flow meter for the light phase, 14 an electric heater, 15 a stirrer (200 r.p.m.), and 16 a thermometer.

EXAMPLE

Figure 1:
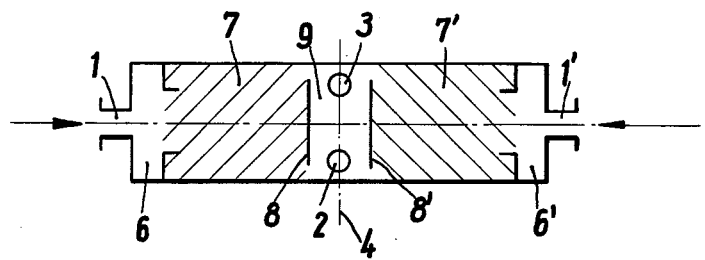
FIG. 1 is a vertical transverse sectional view showing a separator chamber according to the invention provided with inlets disposed at two opposite points of the periphery.
Figure 2:
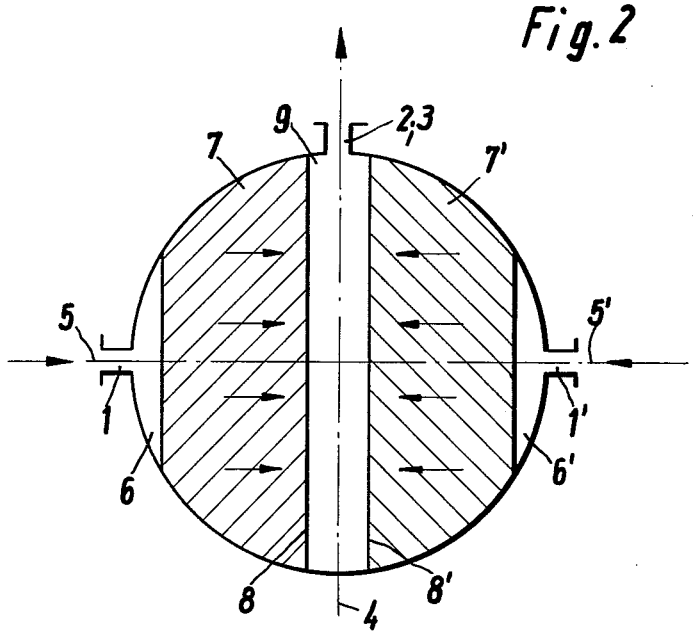
FIG. 2 is a horizontal transverse sectional view showing the arrangement of FIG. 1.

A dispersion consisting of 27 % N-methylpyrrolidone, 14% ethylene glycol, 36% toluene, and 23% n-heptane by weight is fed through inlets 1, 1' into the separator chamber of a counterflow extractor shown in FIGS. 1 and 2. The separator chamber is 6 m in diameter and has a height of 0.8 m. The dispersion flows through the distributor chambers 6, 6' into the separator chambers 7 and 7', which are filled with turnings of high-grade stainless steel. The dispersion flows through these separator chambers to the weirs 8, 8' in two partial streams, which are at the same rate and have opposite directions. The heavy and light phases, respectively, flow under and over the weirs 8, 8' into the collecting chamber 9, which is disposed on the diametral chord 4, and are withdrawn from chamber 9 has clear phases through outlets 2 and 3.

In this experiment, a dispersion throughput rate of 924 $m^3$/h was obtained, which corresponds to a throughput rate per unit of area of 42 $m^3/m^2$ h.

Because the dispersions are divided in accordance with the invention into two partial streams flowing at the same rate, the horizontal velocity of the dispersion in the separator chambers 7 and 7' is reduced by approximately one-half. This reduction of the horizontal velocity results in a decisive increase of the throughput rate of a separator chamber.

COMPARISON TESTS

In the comparison tests to be described hereinafter, the dependence of the throughput rate per area of bottom surface on the horizontal velocity of the dispersion in the separator chambers was investigated.

TEST 1

In the set-up shown in FIG. 7, five different known separators were tested. The dispersion described in connection with the example was used also in the tests.

The separators had a rectangular bottom surface of 1 m² and of different configurations and had a height of 0.8 m. The separator chambers 7 were filled with high-grade steel turnings. A dispersion consisting of light and heavy phases in equal parts was fed to the separator chamber. The clear phases were withdrawn through 2 and 3. In each clear phase, the content of the respective other phase was determined. The feed rate of the dispersion was increased until in one phase the content of the other phase exceeded 1%. The resulting feed rate of the dispersion is referred to as throughput rate. Because the separator had a bottom surface area of 1 m², said throughput rate was numerically equal to the throughput rate per unit of area.

The tests had the following result:

Test

| Dimensions of separator chamber | a | b | c | d | e | f |
|---|---|---|---|---|---|---|
| Length, m | 0.5 | 1 | 2 | 3.33 | 5 | 7.15 |
| Width, m | 2 | 1 | 0.5 | 0.3 | 0.2 | 0.14 |
| Height, m | 0.8 | 0.8 | 0.8 | 0.8 | 0.8 | 0.8 |
| Throughput rate, m³/h and throughput rate per unit of area, m³/m² h | 56 | 52 | 42 | 33 | 27 | 22 |
| Horizontal velocity, mm/sec | 10 | 18 | 29 | 38 | 47 | 55 |

Figure 8:
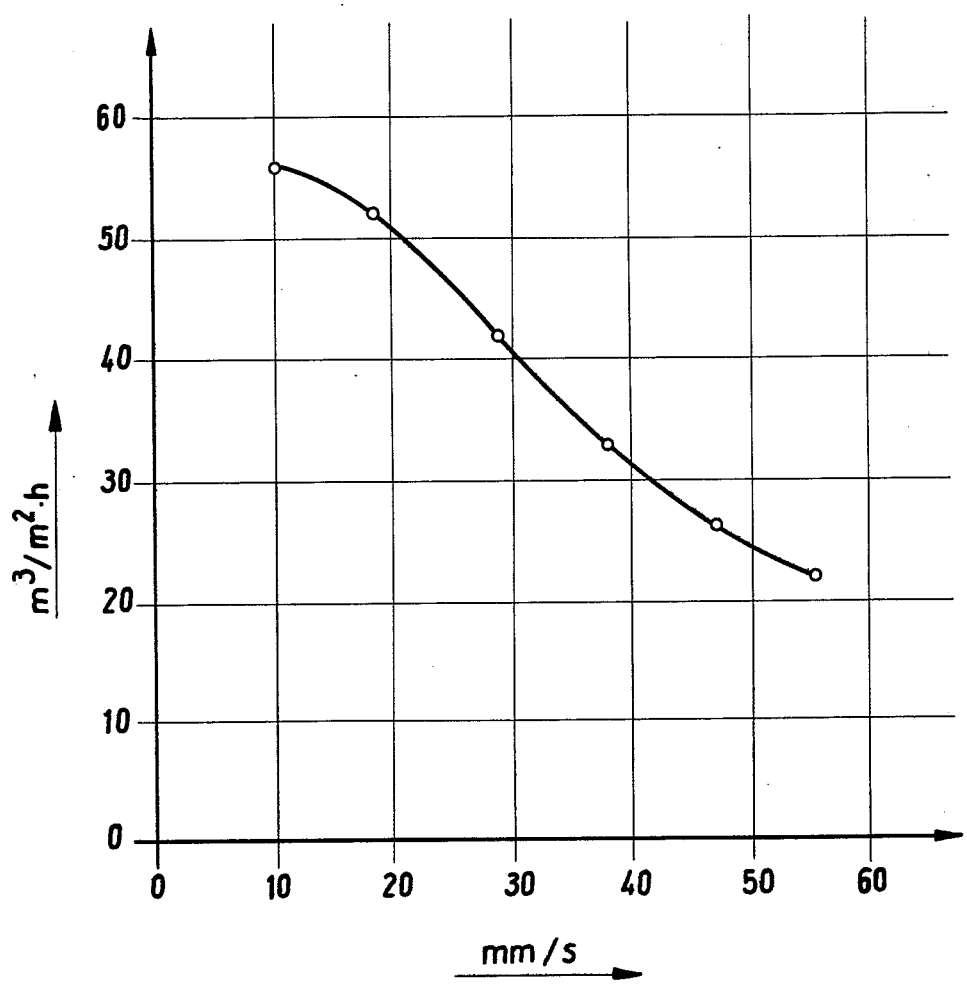
FIG. 8 is a graph showing the throughput rate of the separator chamber per unit of area plotted against the horizontal velocity of the dispersion.

The results are plotted in the chart of FIG. 8.

In the chart of FIG. 8, the horizontal velocity of the dispersion in mm/sec is plotted along the axis of abscissae.

The dispersion throughput rate per unit of area, in m³/m² h, is plotted along the axes of ordinates. The curve, which is based on the measured values compiled in the preceding Table, shows clearly how the attainable throughput rate per unit of the area decreases strongly as the horizontal velocity of the dispersion in the separator chamber increases.

TEST 2

A known separator as shown in FIGS. 3 and 4, which was 6 m in diameter and had a height of 0.8 m, and in which the dispersion inlet was disposed at one point of the periphery and the dispersion outlets 2 and 3 were disposed on the opposite side of the periphery, was used to separate a dispersion such as had been described in Example 1. A throughput rate of 660 m³/h was attained, which corresponds to a throughput rate of 30 m³/m² h per unit of area.

From the result of this test it is clearly apparent that the throughput rate is much lower than in the process according to the invention.

What is claimed is:

1. In a process for liquid-liquid counterflow separation based on the mixer-separator principle wherein a dispersion of two liquid phases is fed to a separator which separates the mixture of the two phases in natural gravitational field, said separator being equipped with separator chambers containing sharp edge turnings consisting of stainless steel and clear phases are withdrawn from said separator, the improvement which comprises feeding the dispersion to be separated to the side of a cylindrical separator having a vertical axis in two partial streams equal in rate of flow, the partial streams flowing through the separator in mutually opposite directions and along respective paths each having a length equal to one-half of the diameter of the separator.

2. Apparatus for liquid-liquid counterflow gravitational separation comprising a housing having at each opposed side an inlet, two separation chambers filled with stainless steel turnings, said separation chambers having a weir therein, said housing having a central collection chamber along a diametrical cord therewithin and having two outlets for the separated clear phases at the periphery of the collection chamber, one of said outlets being positioned in a higher horizontal plane than the other, the outlet positioned on the higher horizontal plane being for lighter phase than the phase removed in the lower outlet.

3. Apparatus for carrying out liquid-liquid countercurrent gravitational separation comprising a housing having an inlet to a distributer chamber, said housing two separator chambers each of which is filled with stainless steel turnings bordered by internal weirs, said housing having two pairs of outlets at opposite sides of the cross-section, each of the pairs consisting of two outlets for the separation of clear phases, the lower outlets being for the separation of the heavy phase and the ligher outlets being for the separation of a light phase.

* * * * *

UNITED STATES PATENT AND TRADEMARK OFFICE
CERTIFICATE OF CORRECTION

PATENT NO. : 4,025,424
DATED : May 24, 1977
INVENTOR(S) : Horst Ludwig Reichhardt et al It is certified that error appears in the above-identified patent and that said Letters Patent are hereby corrected as shown below:

[22] Filed: "Oct. 5, 1974" should read -- Nov. 5, 1974 --.

Column 1, line 51, "points periphery" should read -- points of the periphery --.

Signed and Sealed this twenty-third Day of August 1977

[SEAL]

Attest:

RUTH C. MASON
Attesting Officer

C. MARSHALL DANN
Commissioner of Patents and Trademarks